US008842081B2

(12) United States Patent
Zeng et al.

(10) Patent No.: US 8,842,081 B2
(45) Date of Patent: Sep. 23, 2014

(54) INTEGRATED DISPLAY AND TOUCH SYSTEM WITH DISPLAYPORT/EMBEDDED DISPLAYPORT INTERFACE

(75) Inventors: Henry Zeng, Sunyvale, CA (US); Ji Park, Morgan Hill, CA (US)

(73) Assignee: Synaptics Incorporated, San Jose, CA (US)

( * ) Notice: Subject to any disclaimer, the term of this patent is extended or adjusted under 35 U.S.C. 154(b) by 830 days.

(21) Appl. No.: 13/006,333

(22) Filed: Jan. 13, 2011

(65) Prior Publication Data

US 2012/0182223 A1    Jul. 19, 2012

(51) Int. Cl.
*G06F 3/041* (2006.01)
*G09G 5/00* (2006.01)

(52) U.S. Cl.
CPC .............. *G06F 3/0416* (2013.01); *G09G 5/006* (2013.01)
USPC .......................................... 345/173; 345/178

(58) Field of Classification Search
CPC ............................... G06F 3/0416; G09G 5/006
USPC ............ 345/3.2, 156–184; 348/552; 715/705; 463/10
See application file for complete search history.

(56) References Cited

U.S. PATENT DOCUMENTS

| 4,882,743 | A  | * | 11/1989 | Mahmoud ................... 348/14.09 |
| 5,959,869 | A  | * | 9/1999  | Miller et al. ................... 700/231 |
| 7,071,859 | B1 | * | 7/2006  | Baker ............................ 341/141 |
| 7,904,620 | B2 |   | 3/2011  | Yao et al. |
| 8,151,018 | B2 |   | 4/2012  | Mohanty et al. |
| 8,204,076 | B2 | * | 6/2012  | Kobayashi .................... 370/464 |
| 8,619,047 | B2 | * | 12/2013 | Westhues ....................... 345/173 |
| 8,658,917 | B2 | * | 2/2014  | Westhues ................... 178/18.06 |
| 2002/0052230 | A1 | * | 5/2002 | Martinek et al. ................. 463/10 |
| 2003/0038776 | A1 | * | 2/2003 | Rosenberg et al. ........... 345/156 |
| 2003/0043110 | A1 | * | 3/2003 | Chaves et al. ................. 345/156 |
| 2005/0104800 | A1 | * | 5/2005 | Ii et al. ........................... 345/3.2 |
| 2007/0035433 | A1 | * | 2/2007 | Baker ............................ 341/155 |
| 2007/0257923 | A1 | * | 11/2007 | Whitby-Strevens .......... 345/520 |
| 2008/0092043 | A1 | * | 4/2008 | Trethewey .................... 715/705 |
| 2009/0187686 | A1 |   | 7/2009 | Goodart et al. |
| 2010/0110040 | A1 | * | 5/2010 | Kim et al. ..................... 345/174 |
| 2010/0272102 | A1 |   | 10/2010 | Kobayashi |
| 2011/0164184 | A1 | * | 7/2011 | Avkarogullari et al. ....... 348/571 |
| 2011/0261213 | A1 | * | 10/2011 | Rottler et al. .............. 348/211.6 |
| 2012/0079162 | A1 |   | 3/2012 | Jaramillo |
| 2012/0099020 | A1 | * | 4/2012 | Adams et al. ................. 348/552 |

OTHER PUBLICATIONS

VESA DisplayPort Standard, Version 1, Revision 1a, Jan. 11, 2008.
VESA DisplayPort Standard, Version 1, Revision 2, Jan. 5, 2010.

* cited by examiner

*Primary Examiner* — Prabodh M Dharia
(74) *Attorney, Agent, or Firm* — Osha Liang LLP

(57) ABSTRACT

An integrated controller for an integrated display and touch panel and its associated method provide (a) a DisplayPort or embedded DisplayPort interface for communicating control and data signals for both display and touch functions between a host system and the integrated controller, wherein the touch control and data signals are communicated over an auxiliary channel of the DisplayPort or embedded DisplayPort interface; (b) a display panel interface for communicating display data and control signals between the integrated controller and a display monitor; (c) a touch panel interface for communicating touch data and control signals between the integrated controller and a touch panel; and (d) a control circuit which processes the display and touch control and data signals of the DisplayPort or embedded DisplayPort interface, the display data and control signals of the display panel interface and the touch data and control signals of the touch panel interface.

33 Claims, 2 Drawing Sheets

INTEGRATED DISPLAY AND TOUCH SYSTEM WITH DISPLAYPORT/EMBEDDED DISPLAYPORT INTERFACE

BACKGROUND OF THE INVENTION

1. Field of the Invention

The present invention relates to high-speed graphical display systems. In particular, the present invention relates to high-speed graphical display systems with touch screen input capability.

2. Discussion of the Related Art

Modern computers interact with the human user over many data input and data output devices. One particularly effective form of data output to a human user is through a visual means, such as a graphical or video display monitor (e.g., LCD display monitor). In many applications the graphical display solicits data input from the human user. In that regard, it is a particularly effective form of data input from the human user when the input capability is integrated with the graphical display, so that the human user can provide the solicited data input in the context of the displayed image. A tactile ("touch") system is one such data input device. In a tactile system, a touch-sensitive surface is overlaid onto a graphical display monitor, so that the human user can indicate the data to be input by touching the display monitor using his/her fingers in the context of the image displayed. For example, the human user may indicate scrolling of a displayed page of text by running a finger down the touch-sensitive surface, along the side of the graphical display. Contact with the touch-sensitive surface sends a stream of data (i.e., tactile responses of the touch-sensitive surface, primarily positions detected over time) to the application program running on a host computer which provides the displayed image. The application program then interprets the data stream to determine the data input.

In the prior art, a graphical display with a touch screen capability interfaces with the host computer through two separate interfaces. Typically, one interface with the host computer is a graphical or video data interface (e.g., DVI-D or any or various forms of VGA interface), while the other interface with the host computer is the tactile device interface. The tactile device interface is typically provided by the universal serial bus (USB) or a proprietary interface specified by the manufacturer of the tactile system. As a result, because two sets of cables are required, the interface costs are high and the footprint of the touch-capable graphical display is large also.

SUMMARY

According to one embodiment of the present invention, an integrated controller for an integrated display and touch panel provides (a) a DisplayPort or embedded DisplayPort interface for communicating control and data signals for both display and touch functions between a host system and the integrated controller, wherein the touch control and data signals are communicated over an auxiliary channel of the DisplayPort or embedded DisplayPort interface; (b) a display panel interface for communicating display data and control signals between the integrated controller and a display monitor; (c) a touch panel interface for communicating touch data and control signals between the integrated controller and a touch panel; and (d) a control circuit which processes the control and data signals for both display and touch functions of the DisplayPort or embedded DisplayPort interface, the display data and control signals of the display panel interface and the touch data and control signals of the touch panel interface.

According to one embodiment, the control circuit includes a display controller and a touch controller, in which the touch controller provides data signals according to an industry standard. In that embodiment, the integrated controller further includes a protocol conversion circuit between the DisplayPort or embedded DisplayPort interface and the touch controller. The protocol conversion circuit translates between the signaling conventions of the industry standard and the AUX terminal of the DisplayPort or embedded DisplayPort interface. In some embodiments, the industry standard may be a touch serial standard. In other embodiments, the industry standard may be the universal serial bus.

According to one embodiment of the present invention, the touch controller may include a timing controller, which provides the touch data and control signals to the touch interface using mini-low voltage differential signals. The touch controller may also include a serial digital data interface, which may be, for example, the serial peripheral interface.

According to one embodiment of the present invention, the touch controller may include a microcontroller unit for executing a firmware program, which may be stored in a persistent form in a non-volatile memory device.

The present invention is better understood upon consideration of the detailed description in conjunction with the accompanying drawings.

DETAILED DESCRIPTION OF THE PREFERRED EMBODIMENTS

Figure 1:
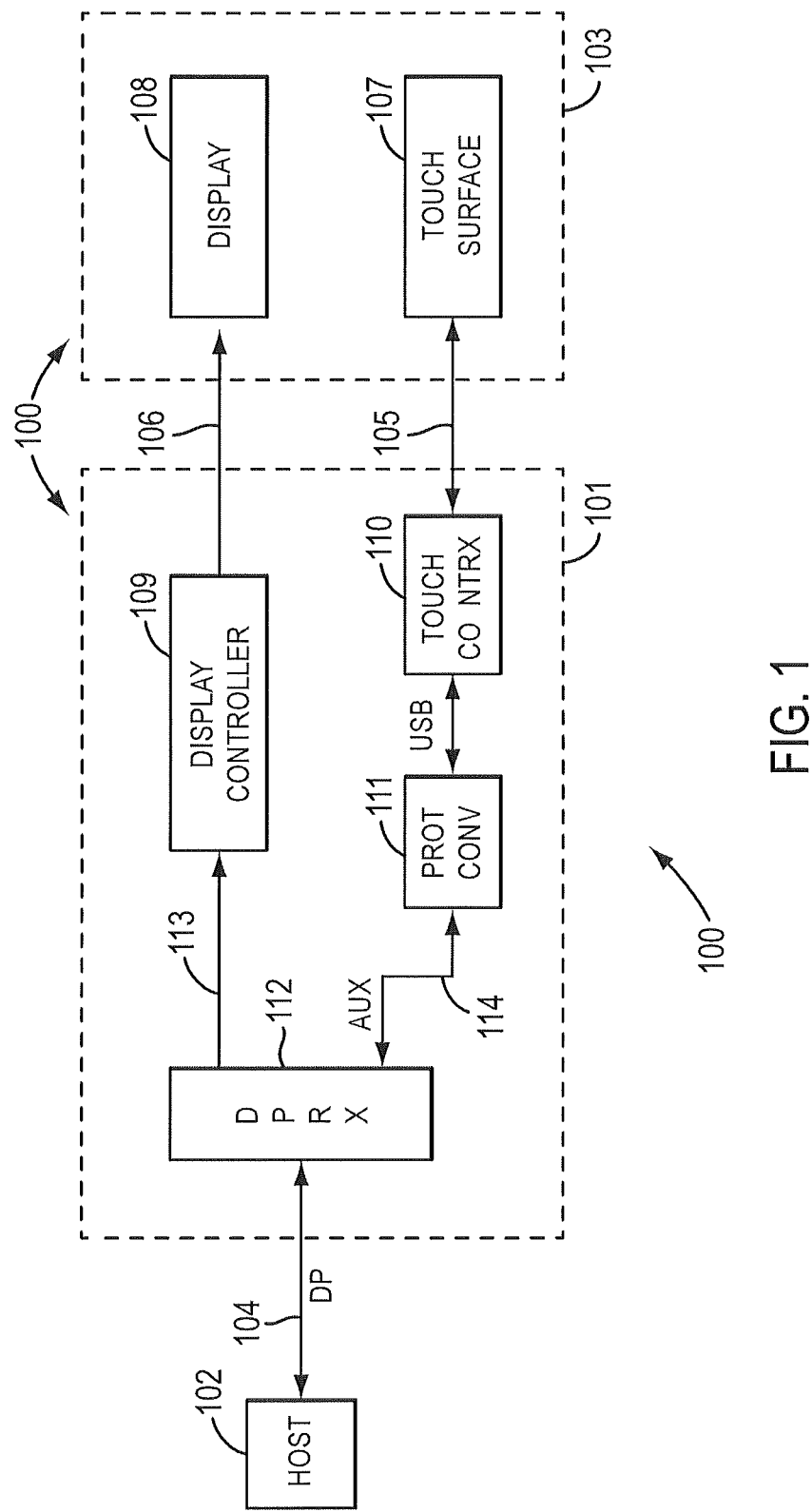
FIG. 1 is a system block diagram of graphical display system 100, which integrates display and tactile (or touch) capabilities, in accordance with one embodiment of the present invention.

FIG. 1 is a system block diagram of exemplary graphical display system 100 integrating display and tactile (i.e., touch) capabilities, in accordance with one among many embodiments of the present invention. As shown in FIG. 1, graphical display system 100 in this example includes controller module 101, which communicates with host processor 102 over a DisplayPort (DP) interface 104 and with integrated display and touch panel 103 over display data and control lines 105 and touch data and control lines 106, respectively. DP interface 104 in this embodiment is an industry standard interface promulgated by the Video Electronics Standards Association (VESA). DP interface 104 may be implemented with or without an industry standard DP cable. When DP interface 104 is implemented without an industry standard DP cable, the interface (referred to as an "Embedded DisplayPort" or "eDP" interface) is typically a set of internal interconnections, such as the internal interconnections in a notebook computer.

DP interface 104 typically includes 1, 2, or 4 high-speed communication "lanes" each being implemented by a differential data pair of signal lines. Depending on the number of communication lanes enabled, DP interface 104 is capable of data rates of 1.62, 2.7 or 5.4 Gbits/s, using a 10-bit symbol for each 8-bit datum transmitted. Each communication lane may also embed an encoded self-clock with frequencies selected from 162, 270 or 540 MHz. In addition, an auxiliary half-duplex bidirectional channel (AUX) capable of supporting up to 720 Mbits/second data rate (version 2.0) is also provided. The AUX channel is also provided in the form of a differential pair of signal lines.

In one embodiment, integrated display and touch panel 103 may include display monitor 108, which may be a display monitor complying with the Data Display Monitor (DDM) industry standard, and conventional touch panel 107. In one embodiment, display monitor 108 is provided data and control signals using mini-low voltage differential signals (mLVDS) on data or control lines 106; alternatively, data and control signals for display monitor 108 may also be provided using reduced swing differential signals (RSDS) on data and control lines 106. Data and control lines 105 provide control signals to the tactile surface 107 and receive data from tactile surface 107 data representing the tactile responses detected by tactile surface 107. In some embodiments, data and control lines 106 may also support mLVDS.

Controller module 101 may be implemented by one or more circuit boards or by one or more integrated circuits. In one embodiment, as shown in FIG. 1, controller module 101 includes a DP receiver 112, display controller 109, touch controller 110, and protocol conversion circuit 111. Display controller 109 processes signals in the high-speed data lanes of DP receiver 112 to generate control and data signals to drive a graphical or video display over control and data lines 106, as discussed above. Examples of suitable display controllers may be found in any of the controllers in the VPP 1600 series of display controllers for LCD monitors, provided by Integrated Device Technology, Santa Clara, Calif. Touch controller 110 may be implemented, for example, by any suitable conventional controller for a touch system, or any other suitable touch system controller, such as described next with respect to FIG. 2.

As discussed above, in one exemplary conventional touch system controller the data and control signals to and from the host computer are communicated over a USB interface. If such a controller is implemented in controller module 101, protocol conversion circuit 111 translates the USB signals to and from the AUX terminal of DP receiver 112.

In an alternative embodiment, touch controller 110 provides, rather than a USB interface, a touch serial interface. In that case, protocol conversion circuit 111 is configured to translate the touch serial signals to and from the AUX terminal of DP receiver 112.

In still another alternative embodiment, touch controller 110 is provided as part of integrated display and touch panel 103 and not as part of controller module 101. In that embodiment, data and control signals flow between controller module 101 and integrated display and touch panel 103 over a USB interface or a touch serial interface, as the case may be.

Figure 2:
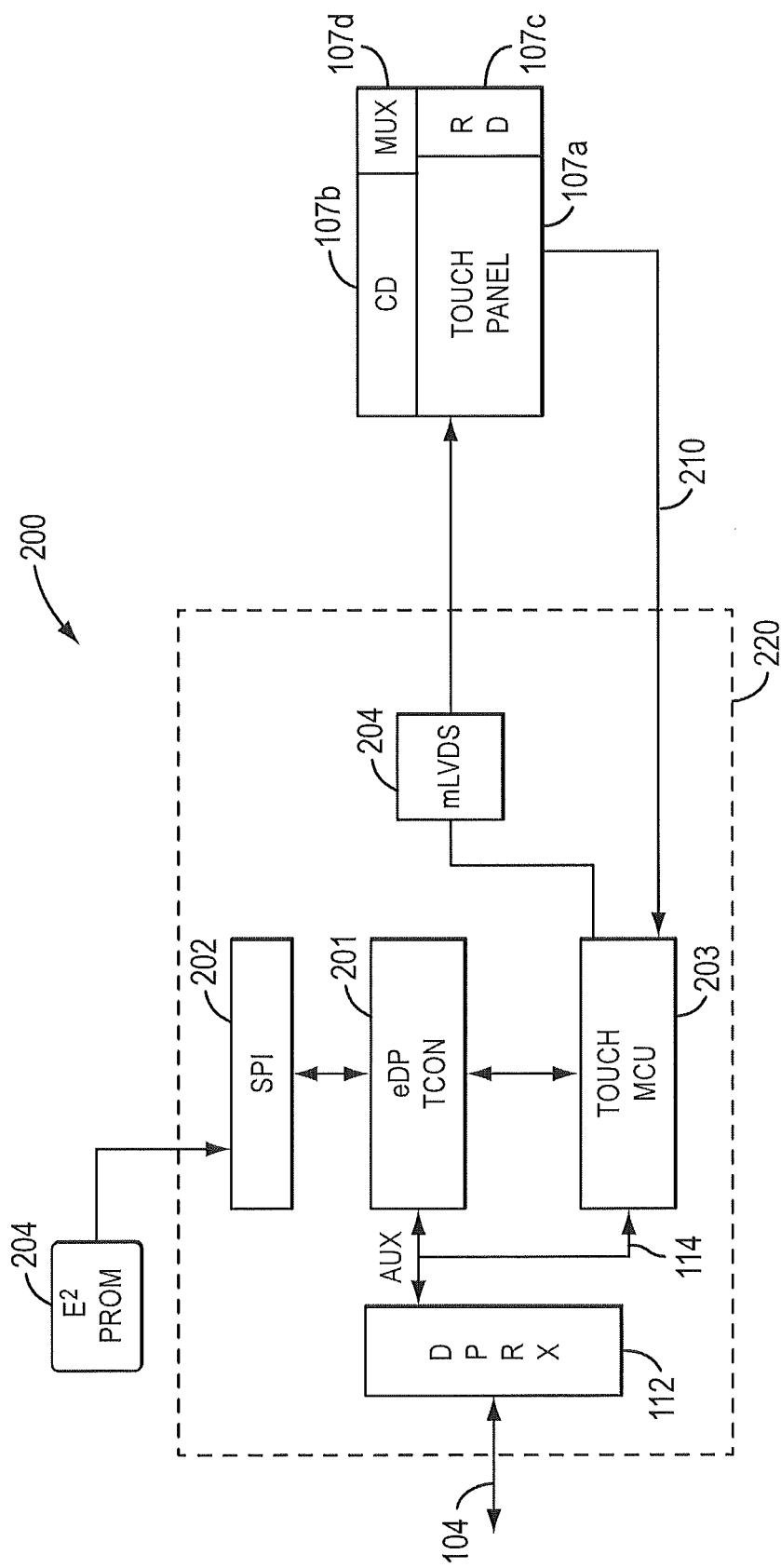
FIG. 2 is a block diagram of exemplary touch controller 200, which may be suitable for implementing touch controller 110 of FIG. 1, in accordance with one embodiment of the present invention.

FIG. 2 is a block diagram of exemplary touch controller 200, which may be suitable for implementing touch controller 110 of FIG. 1, in accordance of one embodiment of the present invention. As touch controller 200 is designed to directly communicate over the AUX terminal of DP receiver 112, and is not designed to communicate over a USB or touch serial interface, protocol conversion circuit 111 shown in FIG. 1 is not necessary, as MCU 203 may provide protocol conversion. Touch controller 200 includes timing controller (TCON) 201 which provides timing control for touch controller 200. TCON 201 communicates directly with DP receiver 112, may under the eDP standard. As an eDP device, DP 104 is not implemented as a standard DP cable, but as internal interconnections to host processor 102, which is housed in the same enclosure as integrated display and touch system 103—i.e., as part of a notebook computer, for example. Touch microcontroller unit (MCU) 203 executes a firmware touch control program according to data and control signals from host computer 102 and delivers the control signals through mLVDS to touch panel 107. The firmware touch control program executed by MCU 203 may be stored in a persistent form in non-volatile memory 204 and transferred at power-up through serial peripheral interface (SPI) 202 to a volatile memory accessed by MCU 203.

As shown in FIG. 2, touch panel 107 includes tactile surface 107a, column decoder (CD) 107b, row decoder (RD) and analog-to-digital (A/D) switch and multiplexer 107d. In touch panel 107, screen positions in tactile surface 107a are defined by a number of column lines and a number of row lines, forming a grid. These positions are scanned according to a column coordinate counter and a row coordinate counter, which are decoded by CD 107b and RD 107c, respectively. Tactile surface 107a can be implemented using any of a number of touch-sensing techniques and physical principles, such as resistance, capacitance and surface acoustic waves. Regardless of the touch-sensing technique used, when a tactile response is detected at any position, the column and row coordinates are reported as positional data through A/D switch and multiplexer 107d to MCU 203 over bus 210. The positional data and timing information are sent over DP interface 104 to a touch device driver running on host computer 102. The touch device driver handles the positional data and timing information from the AUX channel and forwards them to an application program to interpret. In one embodiment, the DP receiver 112, TCON 201, SPI 202, MCU 203 and mLVDS drivers 204 may be integrated into a system-on-a-chip (SOC) type integrated circuit, as indicated by dotted line boundary 220 in FIG. 2.

A single DP or eDP interface therefore allows both data and control access to both the touch and display functions of an integrated display and touch device.

The above detailed description is provided to illustrate the various embodiments of the present invention and is not intended to be limiting. Numerous modifications and variations within the scope of the present invention are possible. The present invention is set forth in the following claims.

We claim:

1. An integrated controller for an integrated display and touch system (IDTS), comprising:
   a DisplayPort or embedded DisplayPort interface for communicating touch data and display data between a host system and the integrated controller,
      wherein the touch data is communicated over an auxiliary channel of the DisplayPort or embedded DisplayPort interface, and
      wherein the touch data comprises positional data and timing information corresponding to a touch panel of the IDTS;
   a display panel interface for communicating display data between the integrated controller and a display monitor;
   a touch panel interface for communicating touch data bidirectionally between the integrated controller and the touch panel; and
   a control circuit which processes the display data and touch data of the DisplayPort interface, the display data of the display panel interface, and the touch data of the touch panel interface.

2. The integrated controller of claim 1, wherein the control circuit comprises a display controller and a touch controller.

3. The integrated controller of claim 2, wherein the touch controller provides the touch data according to an industry standard, and wherein the integrated controller further comprises a protocol conversion circuit between the DisplayPort or embedded DisplayPort interface and the touch controller, the protocol conversion circuit for translating between the signaling conventions of the industry standard and the auxiliary channel of the DisplayPort or embedded DisplayPort interface.

4. The integrated controller of claim 3, wherein the industry standard is a touch serial standard.

5. The integrated controller of claim 3, wherein the industry standard is a universal serial bus.

6. The integrated controller of claim 2, wherein the touch controller comprises a timing controller.

7. The integrated controller of claim 2, wherein the touch controller provides the touch data to the touch panel interface using mini-low voltage differential signals.

8. The integrated controller of claim 2, wherein the touch panel interface comprises a serial digital data interface.

9. The integrated controller of claim 8, wherein the serial digital data interface comprises a serial peripheral interface.

10. The integrated controller of claim 2, wherein the touch controller comprises a microcontroller unit for executing a firmware program.

11. The integrated controller of claim 10, further comprising a non-volatile memory device for storing the firmware program in a persistent form.

12. A method for providing an integrated controller for touch data and display data, comprising:
communicating over a DisplayPort or embedded DisplayPort interface touch data and display data between a host system and the integrated controller, wherein the touch data is communicated over an auxiliary channel of the DisplayPort or embedded DisplayPort interface, and wherein the touch data comprises positional data and timing information corresponding to a touch panel;
communicating over a display panel interface display data between the integrated controller and a display monitor;
communicating over a touch panel interface touch data bidirectionally between the integrated controller and the touch panel; and
simultaneously processing in a control circuit the display data and touch data of the DisplayPort or embedded DisplayPort interface, the display data of the display panel interface and the touch data of the touch panel interface.

13. The method of claim 12, wherein the control circuit comprises a display controller and a touch controller.

14. The method of claim 13, wherein the touch controller provides the touch data according to an industry standard, and wherein the integrated controller further comprises a protocol conversion circuit between the DisplayPort or embedded DisplayPort interface and the touch controller, the protocol conversion circuit for translating between the signaling conventions of the industry standard and the auxiliary channel of the DisplayPort or embedded DisplayPort interface.

15. The method of claim 14, wherein the industry standard is a touch serial standard.

16. The integrated controller of claim 3, wherein the industry standard is a universal serial bus.

17. The method of claim 13, wherein the touch controller comprises a timing controller.

18. The method of claim 13, further comprising providing the touch data to the touch panel interface using mini-low voltage differential signals.

19. The method of claim 13, wherein the touch panel interface comprises a serial digital data interface.

20. The method of claim 19, wherein the serial digital data interface comprises a serial peripheral interface.

21. The method of claim 13, wherein the touch controller comprises a microcontroller unit for executing a firmware program.

22. The method of claim 21, further comprising storing the firmware program in a persistent form in a non-volatile memory device.

23. An integrated display and touch system, comprising:
a display monitor;
a touch panel overlaid on the display monitor;
a DisplayPort or embedded DisplayPort interface for communicating touch data and display data between a host and an integrated controller, wherein the touch data is communicated over an auxiliary channel of the DisplayPort or embedded DisplayPort interface, and wherein the touch data comprises positional data and timing information corresponding to the touch panel;
a display panel interface for communicating display data between the integrated controller and a display monitor;
a touch panel interface for communicating touch data bidirectionally between the integrated controller and the touch panel; and
a control circuit which processes the display data and touch data of the DisplayPort interface, the display data of the display panel interface, and the touch data of the touch panel interface.

24. The system of claim 23, wherein the control circuit comprises a display controller and a touch controller.

25. The system of claim 24, wherein the touch controller provides the touch data according to an industry standard, and wherein the integrated controller further comprises a protocol conversion circuit between the DisplayPort or embedded DisplayPort interface and the touch controller, the protocol conversion circuit for translating between the signaling conventions of the industry standard and the auxiliary channel of the DisplayPort or embedded DisplayPort interface.

26. The system of claim 24, wherein the industry standard is a touch serial standard.

27. The system of claim 24, wherein the industry standard is a universal serial bus.

28. The system of claim 24, wherein the touch controller comprises a timing controller.

29. The system of claim 24, wherein the touch controller provides the touch data to the touch panel interface using mini-low voltage differential signals.

30. The system of claim 24, wherein the touch panel interface comprises a serial digital data interface.

31. The system of claim 30, wherein the serial digital data interface comprises a serial peripheral interface.

32. The system of claim 24, wherein the touch controller comprises a microcontroller unit for executing a firmware program.

33. The system of claim 32, further comprising a non-volatile memory device for storing the firmware program in a persistent form.

* * * * *